E. F. WILSON.
COLLAPSIBLE RIM.
APPLICATION FILED DEC. 1, 1919.
1,418,045.
Patented May 30, 1922.
2 SHEETS—SHEET 1.
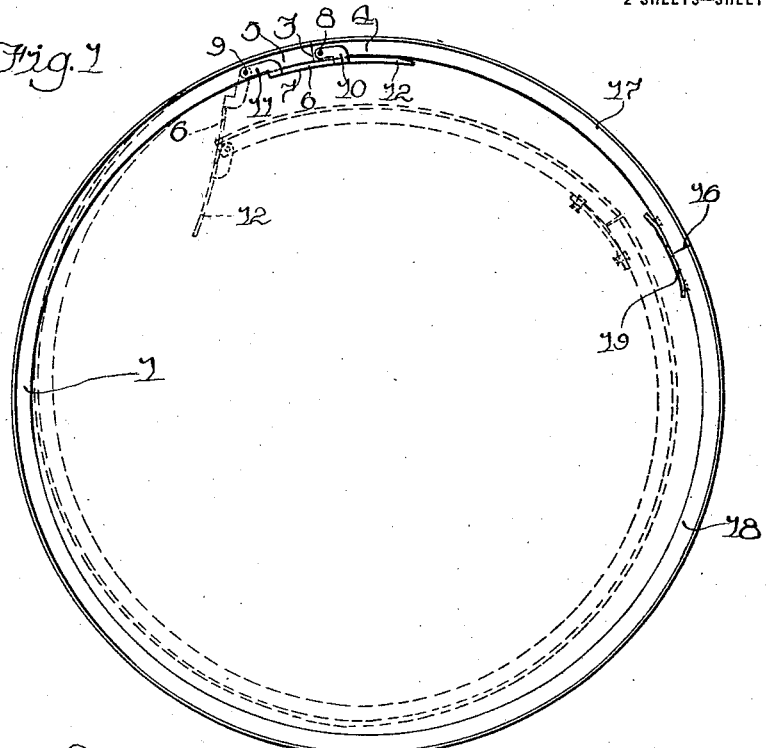
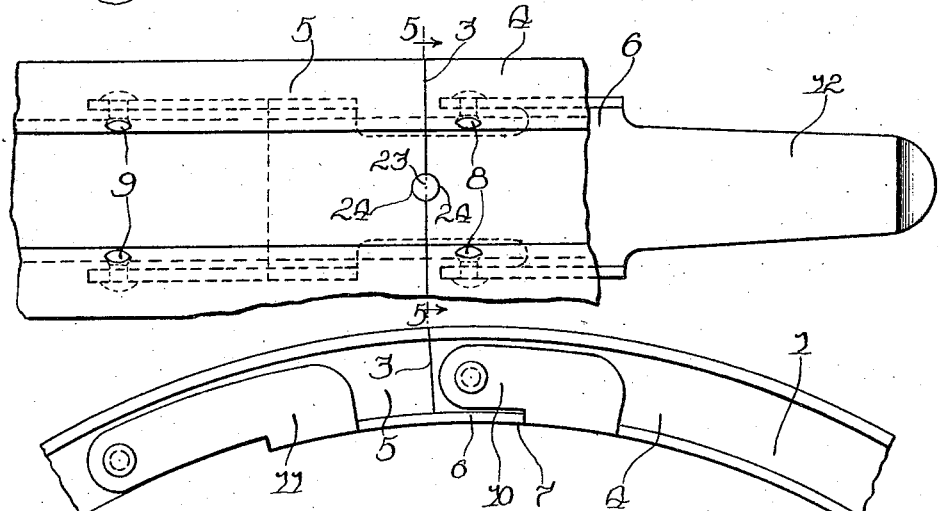
Inventor
Edward F. Wilson
By Brown Boettcher & Dienner
Attorneys

E. F. WILSON.
COLLAPSIBLE RIM.
APPLICATION FILED DEC. 1, 1919.

UNITED STATES PATENT OFFICE.

EDWARD FAY WILSON, OF CHICAGO, ILLINOIS, ASSIGNOR TO LIGHTNING CHANGE RIM CORPORATION, OF BERRIEN SPRINGS, MICHIGAN, A CORPORATION OF MICHIGAN.

COLLAPSIBLE RIM.

1,418,045.   Specification of Letters Patent.   Patented May 30, 1922.

Application filed December 1, 1919. Serial No. 341,803.

*To all whom it may concern:*

Be it known that I, EDWARD FAY WILSON, a citizen of the United States, residing at Chicago, in the county of Cook and State of Illinois, have invented a certain new and useful Improvement in Collapsible Rims, of which the following is a full, clear, concise, and exact description, reference being had to the accompanying drawings, forming a part of this specification.

This invention relates to improvements in collapsible rims for carrying automobile tires and has particular reference to collapsible rims for use with tires having substantially inexpansible bases or base beads.

Rims for carrying such tires have circumferential edge flanges and one form of collapsible rim is provided with a transverse cut at one point in its circumference. Various forms of links have been devised for swinging one end of the rim within the other end and in overlapping relation for reducing the over-all dimensions of the rim sufficiently to permit its flanges to pass freely through the tire in mounting and demounting the tire.

I have provided a rim of this character having a link which spans the cut in the rim and is pivoted to the flanges thereof, the link being so formed that its side parts freely pass the ends of the rim in collapsing operation without the necessity, existing in some form of links, of slotting the flanges of the rim.

It is a particular object of my invention to provide a simple form of link for connecting the ends especially of a split rim of the Dunlop type, which can be easily and readily applied without the necessity of elaborate and expensive tools and appliances and which does not require registering slots in the flanges of the rim at the linked ends.

My invention resides in a collapsible rim cut apart at one point in its circumference and having the ends thus formed, linked together by a link which spans the cut and has side or lateral extensions embracing the flanges of the rim. These extensions are pivotally connected to the ends of the rim and the link is so formed that one end of the rim can swing freely within the other end without any hindrance from the link.

My invention will be more readily understood by reference to said accompanying drawings in which:

Figure 1 is a side elevation of a rim made in accordance with my invention, showing the rim in extended condition in full lines and in collapsed condition in dotted lines;

Figure 2 is a fragmentary plan view of the rim and the connecting link;

Figure 3 is a fragmentary side elevation of the ends of the rim;

Figure 4:
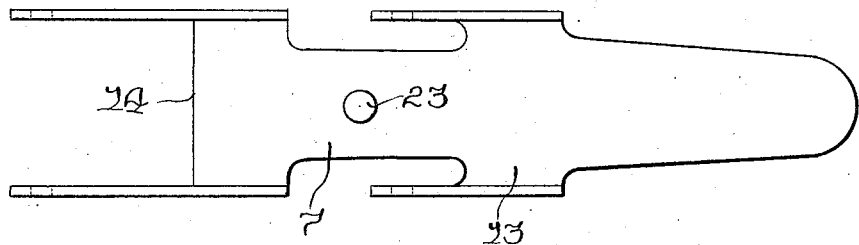
Figure 4 is a plan view of the connecting link.

In said drawings 1 is a tire carrying rim having side flanges 2, forming a channel, within which the pneumatic tire is held. Obviously, the flanges 2 can take the form of clincher flanges or the well known Dunlop flanges.

The rim is cut apart transversely at one point 3 in its circumference, forming two rim ends 4 and 5 which abut each other when the rim is in tire holding or expanded condition, as shown in Figure 1 in full lines.

Ordinarily this single cut is the only one which I use, and I provide an operating link 6 having a central web portion 7 which is curved to conform with the inner periphery of the rim and to lie flat against the same when the rim is expanded as best shown in Figures 1 and 3. This link spans the cut 3 and I pivotally connect this link to the two ends 4 and 5 of the rim by means of pivots 8 and 9 which connect the link to the two ends respectively. I provide the edges of the web portion 7 of the link with pairs of radially extending tongues 10 and 11 which extend out substantially radially of the rim and substantially parallel with the rim flanges for receiving said pivots 8 and 9. The pivots 8 are arranged in the end 4 of the rim extending through the flanges thereof and adjacent to the cut 3, while the pivots 9 are similarly arranged in the flanges of the end 5 of the rim, but some distance from the cut, so that when the link is turned inwardly to the dotted position shown in Figure 1 the end 4 of the rim will be drawn within the circumference of the rim and the rim will be collapsed. The link, thus formed is very rigid and can be made relatively thin so that it occupies but a very short radial distance within the rim web and consequently does not interfere with the placement of the rim upon a wheel which is but slightly smaller in diameter than the inner diameter of the rim. I may extend the web portion 7 circumferentially beyond the side members 10, forming a handle 12 by means of which the link can be forcibly rotated upon the pivots 9 to carry the end 4 of the rim both to its collapsed position and to its extended or tire holding position.

In order to allow the link 6 to swing freely to the collapsed position as shown in dotted lines in Figure 1, without interference with the turned out flanges 2 of the Dunlop form of rim shown, I join the flange parts 10 to the web 7 of the link by transversely extending portions 13 which extend out from the edges of the web portion 7 of the link at points at a distance from the cut 3 so that such connecting parts of the link are circumferentially removed from the adjacent end of the rim sufficiently to afford clearance between such parts and the extreme end of the rim to permit the link to freely pass the end of the rim when said end swings inwardly. At the opposite end of the link the web 7 is cut away as best shown at 14, Figure 4, to allow clearance between this end of the web of the link and the web of the rim to permit the link to swing inwardly to collapse the rim.

Figure 5:
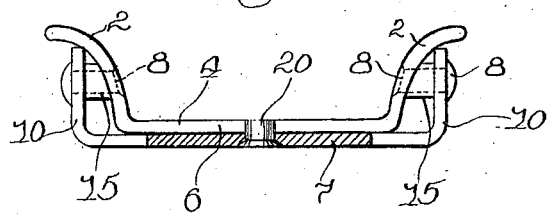
Figure 5 is a transverse radial section of the rim on the line 5—5 of Figure 2.

As shown in Figure 5, I may provide filling thimbles 15 on the pivots 8 and 9 between the parts 10 and 11 and the adjacent flanges of the rim so as to present radial surfaces against which the parts 10 and 11 are held by the pivots.

Figure 6:
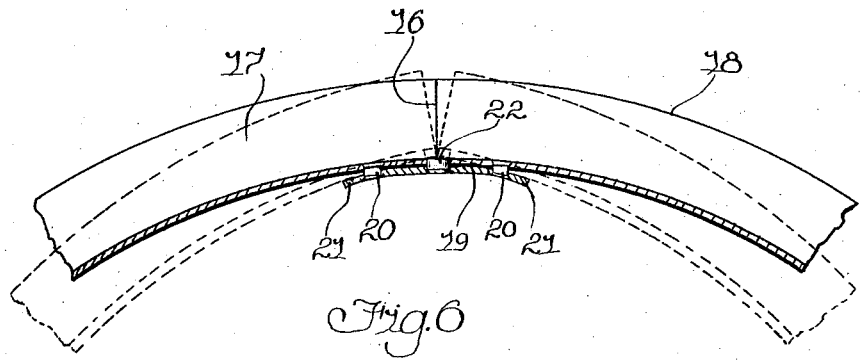
Figure 6 is a fragmentary circumferential section of the rim, showing the connection at the second cut in the rim.

In the application of my invention to some rims of heavy section, I may provide a second cut 16 in the rim dividing the rim into a short section 17 and a long section 18 which together form the complete circumference of the rim. I permanently connect the ends of the rim formed by the cut 16 by means of a plate 19 which spans the cut 16 and lies within and against the inner periphery of the rim. I connect the ends of the plate 19 to the web of the rim by loose connectors such as rivets 20 which permit the two connected ends of the rim to swing inwardly as on a hinge a limited distance, as shown in dotted line in Figure 6, and thereafter the joint becomes rigid. The further swinging of the part 17 inwardly serves to flex inwardly the long section as best shown in dotted lines in Figure 1.

To cause the ends of the rim at the cut 16 to register transversely of the rim I provide a dowel 22 on the plate 19 adapted to be received in notches provided in the meeting ends of the rim.

At the cut 3 in the rim, I provide a similar dowel 23 on the link 6 adapted to be received in opposed notches 24 in the ends 4 and 5 of the rim.

As I avoid the necessity of slotting the flanges of the rim at the linked ends of the rim to permit the link to swing freely, the link of my invention can be applied by an ordinary garage mechanic and without the use of expensive appliances.

As many modifications of my invention will readily suggest themselves to one skilled in the art, I do not limit or confine my invention to the special form of link or to the specific structures herein shown and described except within the scope of the appended claims.

I claim:

1. In a rim cut apart at one point in its circumference, a link connecting the ends of the rim, said link having a web portion extending circumferentially within the rim and spanning the cut, connecting parts extending laterally from the web portion and having their ends bent outwardly substantially parallel with the flanges of the rim and pivotally connected to same, the pivotal connection at one end being adjacent to the cut and at the other end spaced from the cut to swing the first end inwardly when collapsing the rim, the connecting parts for the inwardly swinging rim end extending circumferentially away from the adjacent pivot and then inwardly to the web of the link, the web portion being slotted to provide clearance between the parts and the outwardly turned flanges of the rim at said inwardly swinging rim end to permit the collapsing of the rim.

2. The improvements herein described comprising a channeled rim having outwardly extending and flaring circumferential flanges at its edges, the rim cut apart transversely at one point in its circumference, a link having parts embracing the rim and pivotally connected to the flanges of the rim adjacent to the cut at one end and to the other end of the rim at pivots spaced from the cut, the embracing parts connected to the rim adjacent to the cut extending circumferentially away from the cut and then inwardly to the body of the link, the body of said link being slotted to provide clearance between said parts and the adjacent end of the rim when the rim is collapsed.

In witness whereof I hereunto subscribe my name this 7th day of November, 1919.

EDWARD FAY WILSON.